(12) United States Patent
Kuriyagawa et al.

(10) Patent No.: US 10,517,208 B2
(45) Date of Patent: Dec. 31, 2019

(54) MOWER PROVIDED WITH CENTER PIVOT AXLE

(71) Applicant: HONDA MOTOR CO., LTD., Tokyo (JP)

(72) Inventors: Koji Kuriyagawa, Wako (JP); Hajime Yoshimura, Wako (JP); Norikazu Shimizu, Wako (JP); Shota Tanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 184 days.

(21) Appl. No.: 15/807,791

(22) Filed: Nov. 9, 2017

(65) Prior Publication Data

US 2018/0146615 A1 May 31, 2018

(30) Foreign Application Priority Data

Nov. 25, 2016 (JP) .................................. 2016-228686

(51) Int. Cl.
| | | |
|---|---|---|
| *A01D 34/00* | (2006.01) | |
| *A01D 34/64* | (2006.01) | |
| *A01D 34/74* | (2006.01) | |
| *A01D 43/063* | (2006.01) | |
| *A01D 101/00* | (2006.01) | |

(52) U.S. Cl.
CPC .......... *A01D 34/006* (2013.01); *A01D 34/64* (2013.01); *A01D 34/74* (2013.01); *A01D 43/063* (2013.01); *A01D 2101/00* (2013.01)

(58) Field of Classification Search
CPC ...... B60L 58/40; B60L 15/2036; B60L 1/003; B60L 8/003; B60L 53/14; B60L 50/40; B60L 50/62; B60L 50/66; A01D 34/006; A01D 34/74; A01D 34/64; A01D 43/063; B62D 11/03; B62D 11/04; B62D 11/24
See application file for complete search history.

(56) References Cited

U.S. PATENT DOCUMENTS

| | | | | |
|---|---|---|---|---|
| 4,416,109 A | * | 11/1983 | Slazas .................... | A01D 34/43 |
| | | | | 280/6.154 |
| 4,750,751 A | * | 6/1988 | Schafer ................ | A01D 75/285 |
| | | | | 180/41 |
| 5,163,274 A | * | 11/1992 | Burdsall ................ | A01D 34/74 |
| | | | | 56/14.9 |

(Continued)

FOREIGN PATENT DOCUMENTS

| | | |
|---|---|---|
| JP | 2001-095341 | 4/2001 |
| JP | 2003-180116 | 7/2003 |

(Continued)

OTHER PUBLICATIONS

European Search Report dated Mar. 26, 2018, 7 pages.

*Primary Examiner* — Arpad Fabian-Kovacs
(74) *Attorney, Agent, or Firm* — Rankin, Hill & Clark LLP

(57) ABSTRACT

In a mower provided with a center pivot axle 12, a control unit 1 controls a height adjusting mechanism 19 for a mowing unit 16 so that a grass cutting height is increased from an initial level when an absolute value of a roll angle of the center pivot axle relative to a vehicle body has exceeded a first roll angle threshold value. A cutting blade 21 is stopped when the absolute value of the roll angle has exceeded a fourth roll angle threshold value which is greater than the first roll angle threshold value.

9 Claims, 8 Drawing Sheets

(56) References Cited

U.S. PATENT DOCUMENTS

| | | | | |
|---|---|---|---|---|
| 5,813,697 A * | 9/1998 | Bargenquast | ............ | B60G 9/02 280/6.154 |
| 6,062,333 A * | 5/2000 | Gordon | ................ | A01D 34/64 180/311 |
| 6,857,254 B2 * | 2/2005 | Melone | ................ | A01D 34/64 56/15.8 |
| 7,107,746 B2 * | 9/2006 | Melone | ................ | A01D 34/64 56/15.8 |
| 7,975,786 B2 * | 7/2011 | Ishii | ...................... | A01D 34/78 180/6.5 |
| 8,397,367 B2 * | 3/2013 | Melone | ................ | A01D 34/64 29/428 |
| 8,838,311 B2 * | 9/2014 | Koike | ................. | B62D 11/003 701/22 |
| 10,207,557 B2 * | 2/2019 | Bjorn | ................... | A01D 34/81 |
| 2005/0023049 A1 * | 2/2005 | Ferree | .................. | B60K 17/10 180/6.3 |
| 2009/0000839 A1 * | 1/2009 | Ishii | ...................... | A01D 34/64 180/65.51 |
| 2012/0323420 A1 * | 12/2012 | Koike | ................. | B62D 11/003 701/22 |
| 2015/0006025 A1 * | 1/2015 | Rhoades | .............. | A01D 34/006 701/33.2 |
| 2016/0295797 A1 | 10/2016 | Ito et al. | | |
| 2016/0316619 A1 * | 11/2016 | Johanek | ................ | A01D 34/74 |
| 2017/0034996 A1 * | 2/2017 | Kruckeberg | ........... | A01D 34/74 |
| 2017/0120755 A1 * | 5/2017 | Ito | ............... | B60L 3/10 |
| 2017/0202136 A1 * | 7/2017 | Dombrowski | ....... | A01D 34/006 |
| 2017/0280623 A1 * | 10/2017 | Yamamura | ........... | A01D 34/008 |
| 2018/0148089 A1 * | 5/2018 | Kuriyagawa | ........ | B62D 11/003 |
| 2019/0075724 A1 * | 3/2019 | Becke | ................... | A01D 34/78 |

FOREIGN PATENT DOCUMENTS

| | | | | |
|---|---|---|---|---|
| JP | 2014-143984 | 8/2014 | | |
| JP | 2015-084710 | 5/2015 | | |
| JP | 2016198056 A | * 12/2016 | ........... | A01D 34/006 |

* cited by examiner

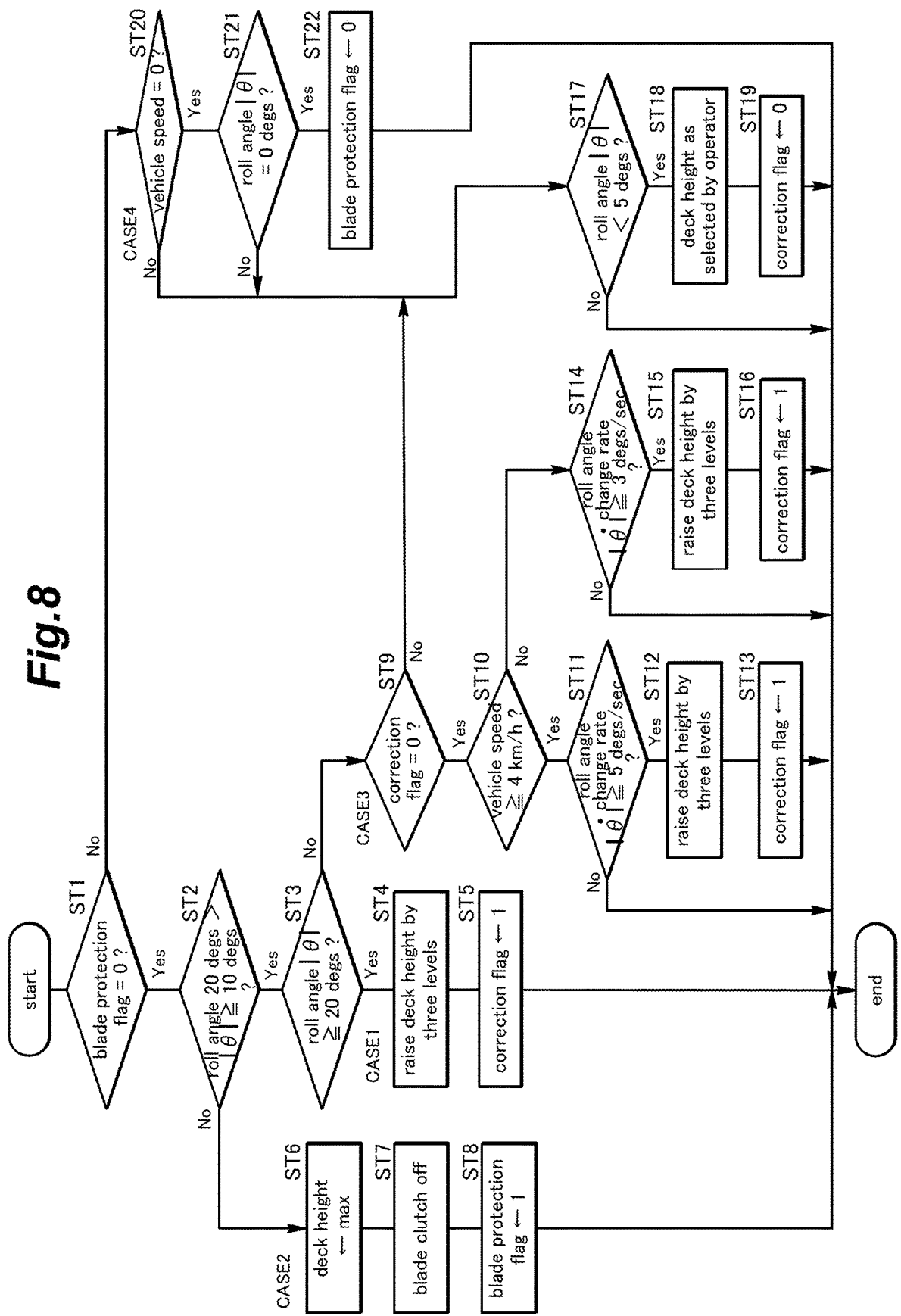

MOWER PROVIDED WITH CENTER PIVOT AXLE

TECHNICAL FIELD

The present invention relates to a mower, and in particular to a mower provided with a center pivot axle, and an arrangement for maintaining an even grass cutting height without regard to the condition of the ground surface.

BACKGROUND ART

A mowing unit of a riding mower is typically provided with a height adjusting mechanism for manually selecting the grass cutting height of the mowing unit. JP2015-084710A discloses a mower provided with a mowing unit fitted with a height adjusting mechanism that may be manually operated with a lever or operated by a power actuator via a link mechanism.

A passenger vehicle is often equipped with an independent suspension system in view of maximizing riding comfort. However, in the case of riding power equipment such as a riding mower, a rigid axle suspension system is most commonly used because of high robustness and low cost. If the axle is rigidly attached to the vehicle body, one of the wheels may be lifted from the ground when traveling over an irregular ground surface. To overcome this problem, the axle of the rear wheels or the front wheels may be pivotally supported by the vehicle body at a central point thereof. This system is referred to as "center pivot system" in the following disclosure.

According to the center pivot system, when one of the wheels rides over a bump or drops into a dip, the axle tilts laterally in a corresponding manner, and a lower part of the vehicle body may come excessively close to the ground surface. In particular, if the distance between the cutting blade provided on the bottom side of the vehicle body and the ground surface changes, the grass cutting height changes, and this impairs the grass cutting performance of the mower. If the bottom side of the vehicle body comes excessively close to the ground surface, the cutting blade may hit the ground, and this impairs the durability of the cutting blade.

SUMMARY OF THE INVENTION

In view of such a problem of the prior art, a primary object of the present invention is to provide a mower provided with a center pivot axle and a mowing unit that can prevent the cutting blade from coming excessively close to the ground surface.

To achieve such an object, the present invention provides a mower, comprising: a vehicle body (3); a first axle (10) rigidly supported by the vehicle body and rotatably supporting a pair of wheels (4); a second axle (12) supported by the vehicle via a center pivot (15) and rotatably supporting a pair of wheels (5); a power source (8) for driving the wheels of at least one of the first axle and the second axle; a mowing unit (6) provided in a lower part of the vehicle body and including a cutting blade (21); a height adjusting mechanism (19) provided on the vehicle body and configured to adjust a grass cutting height of the mowing unit; an axle sensor (29) for detecting a roll angle of the second axle relative to the vehicle body; and a control unit (1) for controlling the height adjusting mechanism so that the grass cutting height is increased from an initial level when an absolute value of the roll angle has exceeded a first roll angle threshold value.

As the mower travels on an irregular ground surface and one of the wheels rides over a bump or drops into a dip, the center pivot axle tilts laterally with respect to the vehicle body, and a bottom part of the vehicle comes close to the road surface. Therefore, the cutting blade supported by a lower part of the vehicle body may come excessively close to the ground surface, resulting in an unevenness in the cutting height. However, because the grass cutting height is increased from an initial level when an absolute value of the roll angle has exceeded the first roll angle threshold value, the cutting blade is prevented from coming excessively close to the ground surface.

Preferably, the mower further comprises a speed sensor for detecting a travel speed of the mower, and the control unit is configured to progressively reduce the first roll angle threshold value in a continuous or incremental manner with an increase in the travel speed of the mower.

Raising the grass cutting height requires some time. According to this arrangement, if the travel speed of the mower is relatively high, the first roll angle threshold value is reduced so that the grass cutting height can be raised even when the roll angle is relatively small. Therefore, the grass cutting height is raised before the roll angle increases to an excessive extent so that the grass cutting height can be adjusted in a timely fashion.

Preferably, the control unit is configured to compute an absolute value of a change rate of the roll angle, and to increase the cutting height even when the absolute value of the roll angle is equal to or smaller than the first roll angle threshold value if the absolute value of the change rate of the roll angle is greater than a roll angle change rate threshold value.

Because the grass cutting height is increased if the absolute value of the change rate of the roll angle is greater than a roll angle change rate threshold value even before the roll angle itself has increased to a significant level, the grass cutting height can be adjusted in a highly responsive manner so that the grass cutting height can be adjusted in a timely fashion, and the cutting blade is prevented from coming close to the ground surface in an effective manner.

Preferably, the mower further comprises a speed sensor for detecting a travel speed of the mower, and the control unit is configured to progressively reduce the roll angle change rate threshold value in a continuous or incremental manner with an increase in the travel speed of the mower.

Thereby, the grass cutting height can be adjusted in a timely fashion, and the cutting blade is prevented from coming close to the ground surface in an even more effective manner.

Preferably, when the grass cutting height is increased by the control unit, and the absolute value of the roll angle is equal to or smaller than a second roll angle threshold value, the control unit is configured to restore the grass cutting height to the initial level.

Thereby, when the likelihood of the cutting blade coming excessively close to the ground surface is adequately reduced, the grass cutting height is automatically restored without requiring any action on the part of the operator so that the grass can be cut in an even manner to a maximum extent.

Typically, the second roll angle threshold value is smaller than the first roll angle threshold value so that the control of the grass cutting height can be performed in a stable manner without causing any excessively frequent activation of the height adjusting mechanism.

Preferably, the control unit is configured to raise the mower unit to a maximum height when the absolute value of the roll angle has exceeded a third roll angle threshold value which is greater than the first roll angle threshold value.

Typically, the greater the roll angle of the center pivot axle is, the smaller the minimum distance between the lower part of the vehicle body and the ground surface becomes. Therefore, when the roll angle is significantly high, it is advantageous to raise the grass cutting height to the maximum level so that the lower part of the vehicle body is effectively prevented from coming excessively close to the ground surface.

Preferably, the control unit is configured to control an operation of the cutting blade, and to stop driving the cutting blade when the absolute value of the roll angle has exceeded a fourth roll angle threshold value which is greater than the first roll angle threshold value.

As the cutting blade is stopped when the roll angle has exceeded the fourth roll angle threshold value, and the lower part of the vehicle body has a high likelihood of coming very close to the ground surface, the risk of the damaging the cutting blade can be minimized.

Preferably, the mower further comprise a speed sensor for detecting a travel speed of the mower, and the control unit is configured to enable an operator to restart the cutting blade when the absolute value of the roll angle has changed from a value greater than the fourth roll angle threshold value to a value smaller than a fifth roll angle threshold value which is smaller than the first roll angle threshold value, and the vehicle speed has been reduced to zero.

By thus allowing the cutting blade 21 to be turned on only after the mower has come to a stop on a flat ground surface, the operator is enabled to pay adequate attention to the condition of the mower and confirm if the cutting blade can be safely restarted.

BRIEF DESCRIPTION OF THE DRAWINGS

FIG. 8 is a flowchart of a control process of the control unit of the second embodiment.

DESCRIPTION OF THE PREFERRED EMBODIMENT(S)

Figure 1:
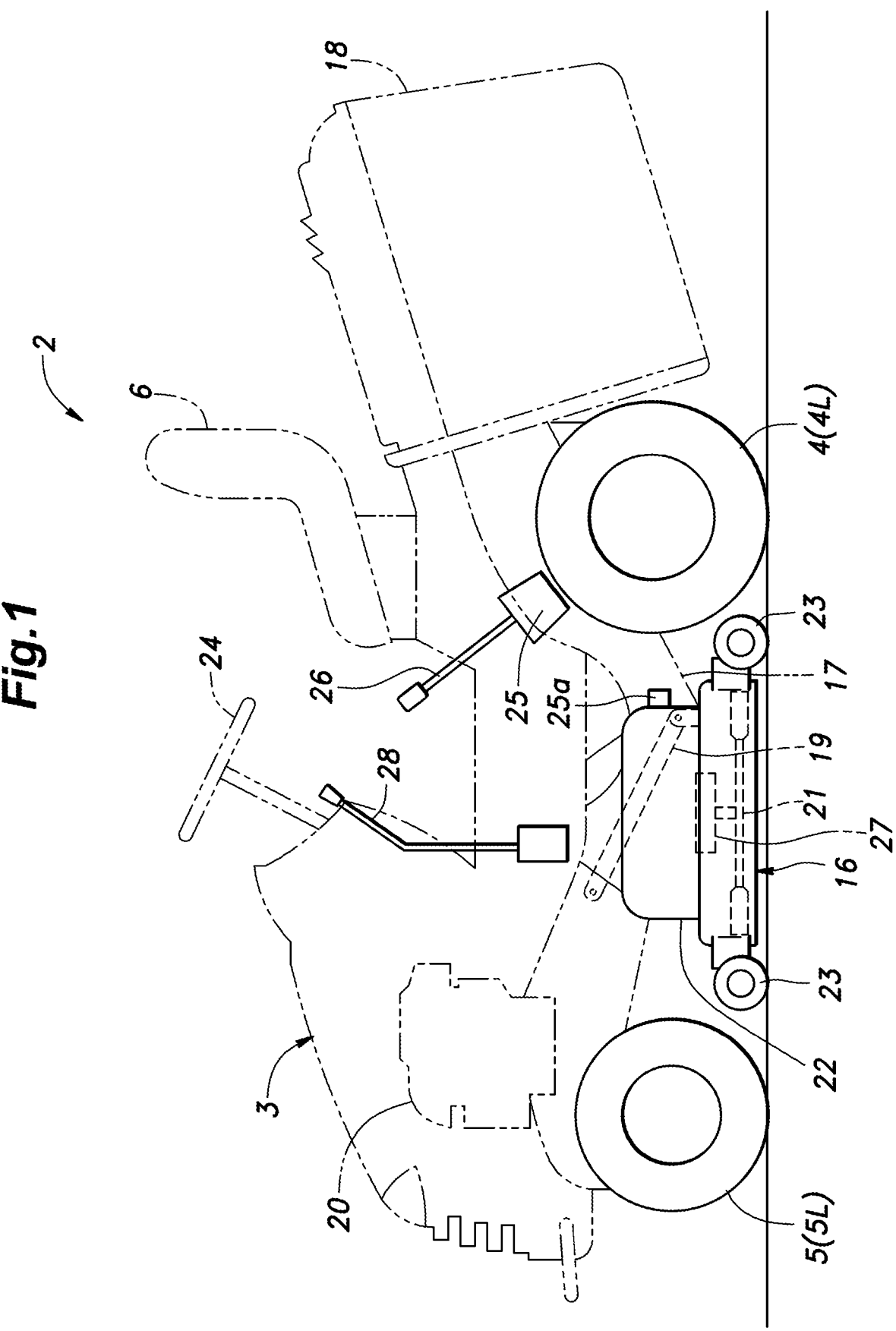
FIG. 1 is a schematic side view of a riding mower according to an embodiment of the present invention.
Figure 2:
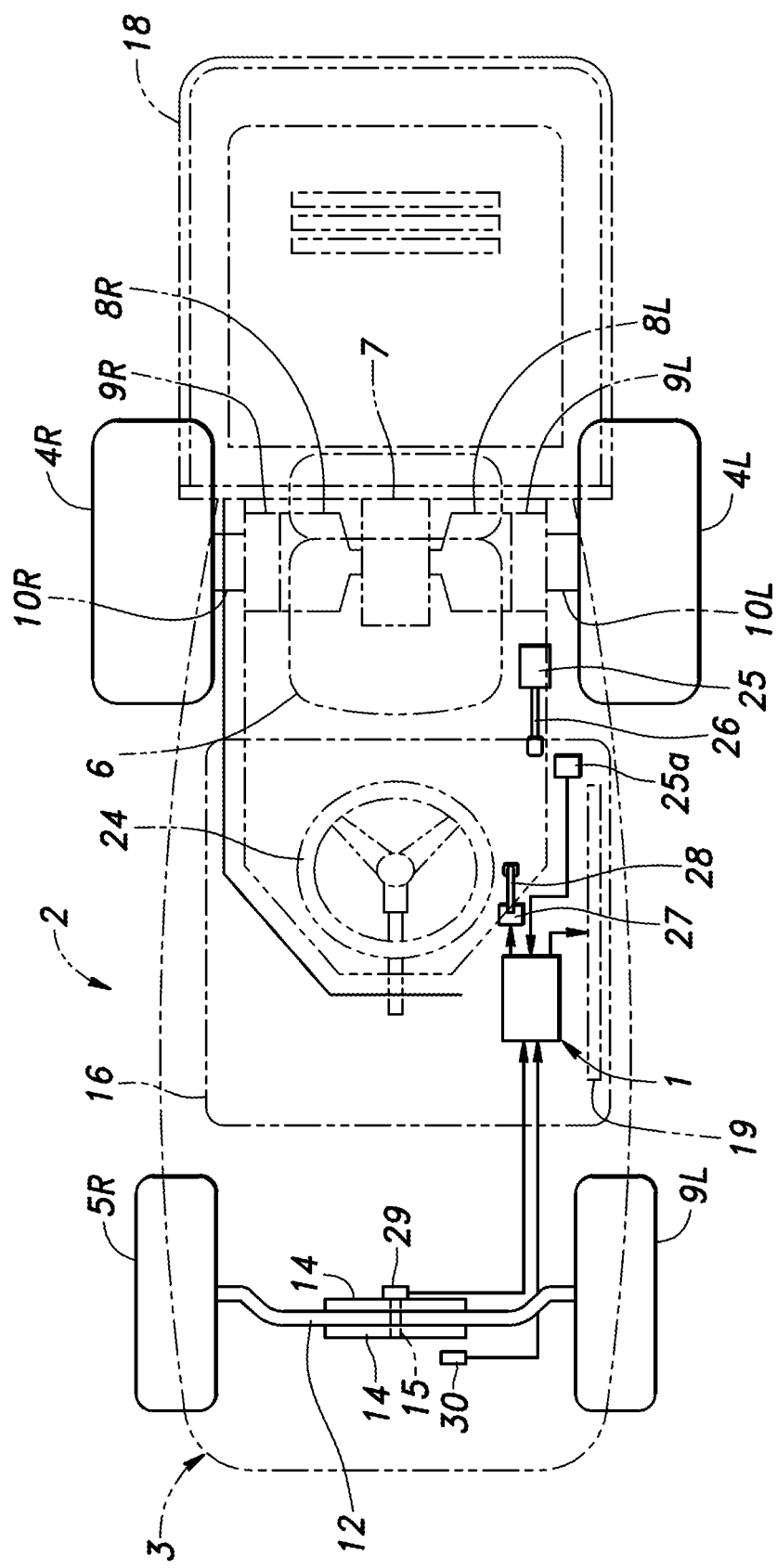
FIG. 2 is a schematic plan view of the riding mower.
Figure 3:
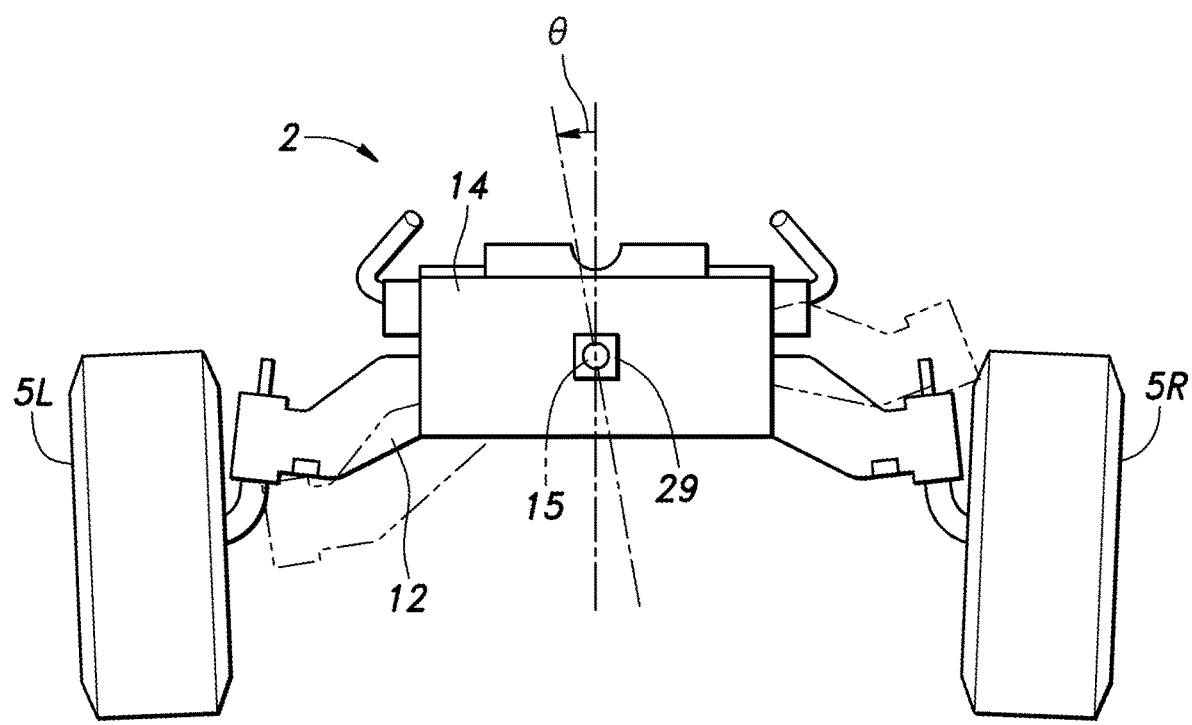
FIG. 3 is a fragmentary rear view of a front axle of the riding mower.

A riding mower 2 according to an embodiment of the present invention is described in the following with reference to FIGS. 1 to 3. The riding mower 2 is generally symmetric about a vertically plane passing centrally through the riding mower 2 in the fore and aft direction. The components on the left and right hand sides are indicated by suffixes L and R, respectively, accompanying the corresponding numerals denoting the components, and these suffixes are omitted when such parts are collectively referred to.

The riding mower 2 is provided with a vehicle body 3 supporting a mowing unit 16 in a lower part thereof. The mowing unit 16 includes an engine 20, and a cutting blade 21 driven by the engine 20. A grass bag 18 is attached to a rear end of the vehicle body 3 so that the grass cut by the cutting blade 21 is forwarded to the grass bag 18 via a chute 17 internally defined in the vehicle body 3 by an air flow created by the rotation of the cutting blade.

The riding mower 2 is provided with a pair of rear wheels 4 and a pair of front wheels 5. The riding mower 2 is further provided with a pair of electric motors 8 having output shafts connected to the respective rear wheels 4 via respective speed reduction units 9. The electric motors 8 and the speed reduction units 9 are coaxially aligned with the rear wheels 4. A battery 7 is positioned centrally between the electric motors 8. The engine 20 is provided with an electric generator not shown in the drawing. The electric power generated by the generator is stored in the battery 7, and the electric motors 8 receive electric power from the battery and the electric power generator under control of a control unit 1 mounted on a central part of the vehicle body 3.

The rear wheels 4, the electric motors 8 and the speed reduction units 9 are rotatably supported by a rear axle 10 which is in turn rigidly supported by the vehicle body 3.

The front wheels 5 are rotatably supported at either lateral end of a front axle 12 which is in turn supported by the vehicle body 3 via a center pivot 15 having a pivot center extending in the fore and aft direction. In the illustrated embodiment, a pair of plate members 14 depend from the vehicle body 3, and interpose a central part of the front axle 12 therebetween. The center pivot 15 is passed through the plate members 14 and the central part of the front axle 12. Owing to this pivot center system, when one of the rear wheels 4 or one of the front wheels 5 rides over a bump or drops into a dip, the front axle 12 tilts in a corresponding direction around the center pivot 15.

The vehicle body 3 is provided with a steering system that includes a steering wheel 24 provided in front of an operator's seat 6, a steering shaft (not shown in the drawings) extending centrally from the steering wheel 24 in a forward and downward direction, and a steering mechanism (not shown in the drawings) connected to the lower end of the steering shaft. The steering system is configured to steer the front wheels 5 according to the steering input supplied thereto via the steering shaft in a per se known manner. Other forms of steering systems such as those using levers may also be used. The vehicle body 3 is further provided with an accelerator pedal (not shown in the drawings) for adjusting the output of the electric motors 8 supplied to the rear wheels 4 and a brake pedal (not shown in the drawings) for applying braking force to the front and rear wheels 4 and 5.

The mowing unit 16 is provided with a deck 22 rotatably supporting the cutting blade 21 and covering the cutting blade 21 from above. The deck 22 is provided with four small wheels 23 to minimize friction with the ground surface. A blade clutch 27 is provided in association with the deck 22 for selectively disconnecting the cutting blade 21 from the engine, and a blade clutch lever 28 for operating the blade clutch 27 is provided laterally next to the steering wheel 24.

The mowing unit 16 is supported by the vehicle body 3 via a lifting mechanism 19 for fully lifting the deck 22 when the mowing unit 16 is not operating, and adjusting the height of the deck 22 when the mowing unit 16 is operating. For this purpose, a height adjustment unit 25 and a height adjustment lever 26 are provided on a part of the vehicle body laterally next to the operator's seat 6.

The control unit 1 is connected to an axle sensor 29 provided in association with the center pivot 15 for detecting a roll angle θ of the front axle 12 relative to the vehicle body 3, a vehicle speed sensor 30 for detecting a travel speed of the mower 2, an accelerator pedal sensor for detecting a depression stroke of the accelerator pedal, and a deck height detection sensor 25a provided in association with the deck 22. The control unit 1 primarily consists of an ECU programmed to control the output of the electric motors 8 according to the signals from these sensors 29, 30 and 25a.

Figure 4:
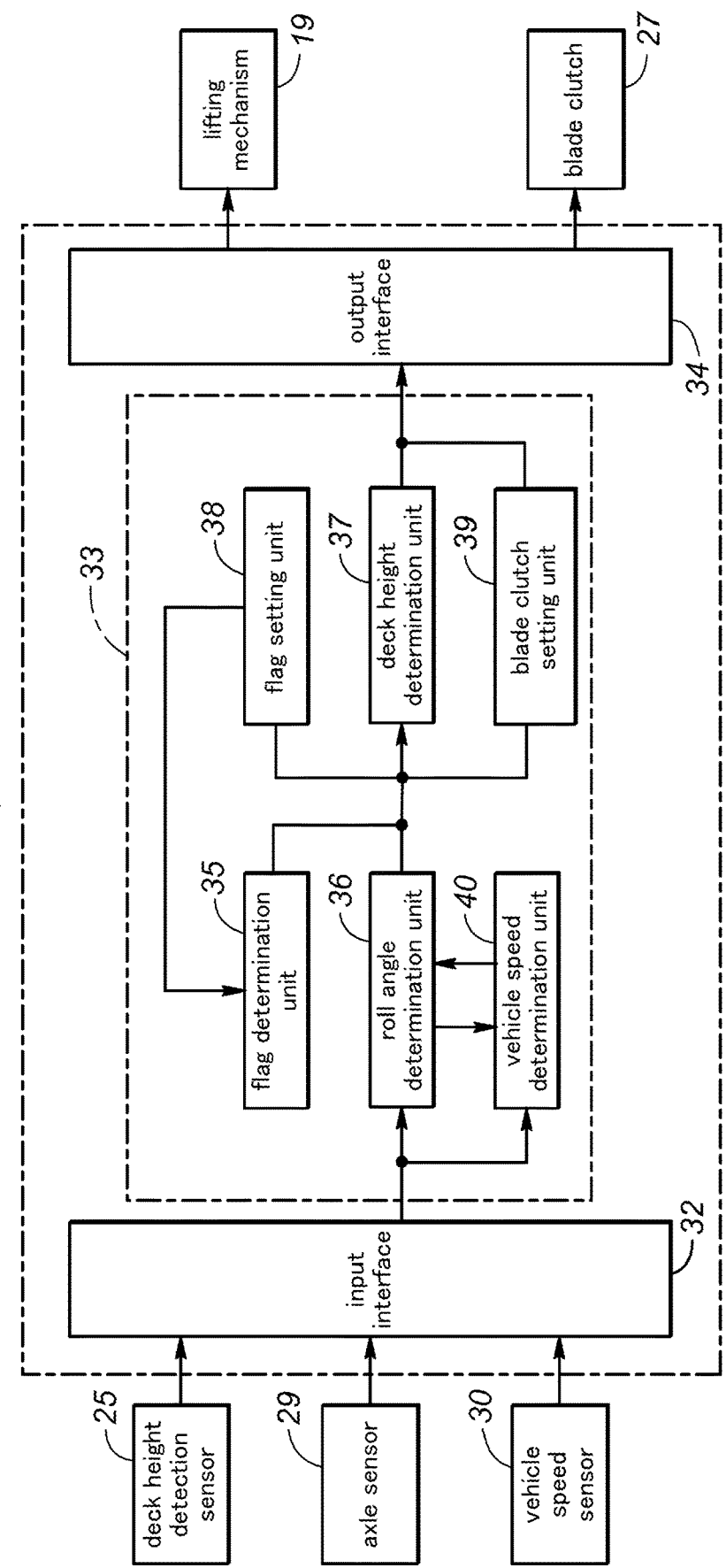
FIG. 4 is a block diagram of a control unit of the riding mower.

The control unit 1 includes a microcomputer, ROM, RAM, peripheral circuits and various drivers, and is connected to the sensors 29, 30 and 25a, the lifting mechanism 19 and the blade clutch 27 as shown in FIG. 4. The control unit 1 includes an input interface 32 for receiving data from the sensors 29, 30 and 25a, a computation unit 33 for determining the height of the deck 22 and the operation of the blade clutch 27, and an output interface 34 for supplying commands provided by the computation unit 33 to the lifting mechanism 19 and the blade clutch 27.

The computation unit 33 includes a flag setting unit 38 for setting a blade protection flag, and a flag determination unit 35 for determining the state of the blade protection flag. When the blade protection flag is 0, the blade clutch 27 is fully controlled by the blade clutch lever 28. When the blade protection flag is 1, the blade clutch 27 is turned off (disconnected) without regard to the state of the blade clutch lever 28. The computation unit 33 includes a roll angle determination unit 36 for determining the roll angle detected by the axle sensor 29, a height setting unit 37 for determining the height of the deck 22, a vehicle speed determination unit 40 for determining the travel speed of the mower 2, and a blade clutch setting unit 39 for selectively turning on the blade clutch 27.

Figure 5:
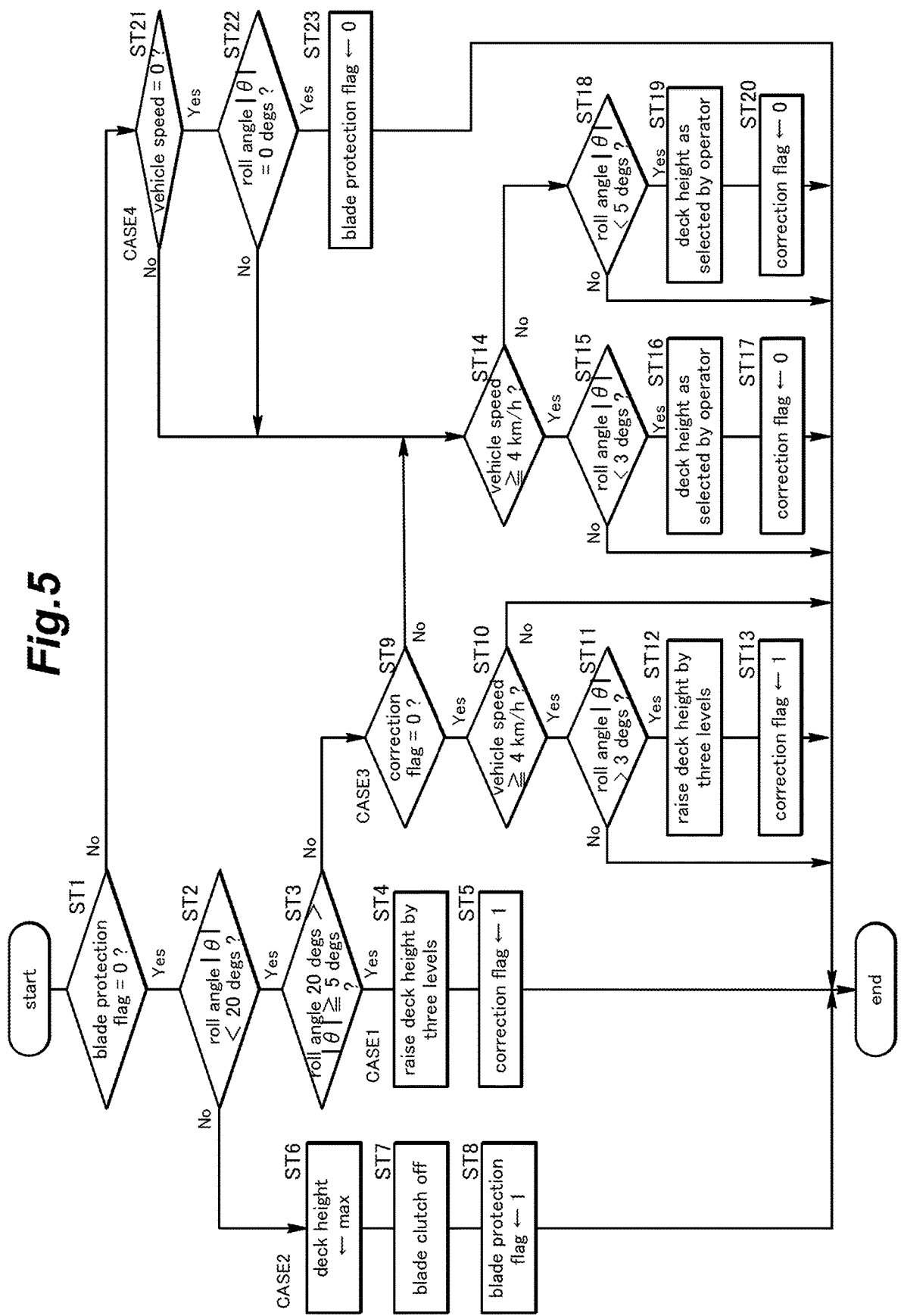
FIG. 5 is a flowchart of a control process of the control unit.

The control process for controlling the operation of the lifting mechanism 19 and the blade clutch 27 performed by the control unit 1 is described in the following with reference to FIGS. 4 and 5. In the following disclosure, the roll angle θ is defined as positive when the front axle 12 is tilted relative to the vehicle body 3 so as to raise the right end thereof, and negative when the front axle 12 is tilted relative to the vehicle body 3 so as to raise the left end thereof (see FIG. 3).

First of all, the flag determination unit 35 of the computation unit 33 determines if the blade protection flag is 0 or 1 (ST1). When the blade protection flag is 0, the blade clutch 27 is controlled by the setting of the blade clutch lever 28. If the blade protection flag is 1, the blade clutch 27 is turned off (disconnected) regardless of the position of the blade clutch 27.

When the blade protection flag is 0 in step ST1, the roll angle determination unit 36 of the computation unit 33 determines (the absolute value of) the roll angle |θ| (ST2, ST3), and classifies the control flow into three cases, Case 1-3 depending on the magnitude of the roll angle |θ|. Please note that the control process discussed in the following is mainly based on the absolute value of the roll angle |θ|, and the absolute value of the roll angle may be simply referred to as the "roll angle" in the following disclosure.

Case 1: (20 degrees>|θ|≥5 degrees)

When the roll angle |θ| is smaller than 20 degrees and equal to or greater than 5 degrees in steps ST2 and ST3, regardless of the vehicle speed, the height setting unit 37 of the computation unit 33 sets the height of the deck 22 (grass cutting height) of the mowing unit 16 to a level three stages higher than the level set by the operator via the height adjustment unit 25 (ST4). In this case, when the operator has set the maximum level, the level one stage lower than the maximum level or the level two stages lower than the maximum level, the height setting unit 37 sets the grass cutting height to the maximum level. Further, the flag setting unit 38 of the computation unit 33 sets a correction flag (which is zero if the correction of the grass cutting height is required, and 1 if no correction of the grass cutting height is required) to 1 (ST5). Thus, the grass cutting height is set three stages higher than the level selected by the operator.

Case 2: (|θ|≥20 degrees)

When the roll angle |θ| is equal to or greater than 20 degrees in step ST2, the height setting unit 37 sets the grass cutting height to the maximum level regardless of the vehicle speed, and the lifting mechanism 19 raises the grass cutting height to the highest level (ST6). Further, the blade clutch setting unit 39 of the computation unit 33 turns off the blade clutch 27 (ST7). The flag setting unit 38 then sets the blade protection flag to 1 (ST8). When the blade protection flag is 1, even if the operator moves the blade clutch lever 28, the blade clutch 27 cannot be turned on or engaged.

Case 3 (5 degrees>|θ|≥0 degrees)

When the roll angle |θ| is greater than 0 degrees and equal to or less than 5 degrees in step ST3, the flag determination unit 35 determines if the correction flag is 0 (ST9). When the correction flag is 0 in step ST9, or when the grass cutting height is as set by the operator, it is determined if the grass cutting height should be raised or not by taking into account the travel speed of the mower 2. The vehicle speed determination unit 40 of the computation unit 33 determines if the vehicle speed is equal to or higher than 4 km/h (ST10). When the vehicle speed is 4 km/h or higher, the roll angle determination unit 36 determines if the roll angle |θ| is equal to or greater than 3 degrees (ST11). When the roll angle |θ| is 3 degrees or greater, the height setting unit 37 raises the grass cutting height from the level set by the operator by three stages (ST12), and the flag setting unit 38 sets the correction flag to 1 (ST13). If the vehicle speed is lower than 4 km/h in step ST10, or when the roll angle |θ| is less than 3 degrees in step ST11, no further processing is performed, and the grass cutting height is left as set by the operator.

In step ST9, when the correction flag is 1, or, in other words, when the grass cutting height is higher than the level set by the operator, the vehicle speed determination unit 40 and the roll angle determination unit 36 determine the vehicle speed and the roll angle, respectively (ST14, ST15, ST18). If the vehicle speed is 4 km/h or higher, and the roll angle |θ| is smaller than 3 degrees, or if the vehicle speed is less than 4 km/h, and the roll angle |θ| is smaller than 5 degrees, the height setting unit 37 returns the grass cutting height to the level set by the operator (ST16, ST19), and the flag setting unit 38 sets the correction flag to 0 (ST17, ST20). Otherwise, no processing is performed and the grass cutting height is kept to be higher than the level set by the operator.

In step ST1, when the blade protection flag is 1 (Case 4), or, in other words, when the grass cutting height is at the maximum level and the blade clutch 27 is turned off to stop the blade 21 from rotating, the vehicle speed determination unit 40 and the roll angle determination unit 36 determine the vehicle speed and the roll angle, respectively (ST21, ST22). When the vehicle speed is 0 and the roll angle |θ| is 0 degrees, or, in other words, when the mower 2 is stationary on a flat ground surface, the flag setting unit 38 sets the blade protection flag to 0 (ST23). By setting the blade protection flag to 0, the operator is enabled to turn on and off the blade clutch 27 by using the blade clutch lever 28. If the vehicle speed is 0 in step ST21, or the roll angle |θ| is other than 0 degrees in step ST22, the control process proceeds to step ST14.

The mode of operation of the control unit 1 is described in the following with reference to FIG. 6.

When any one of the left rear wheel 4 L, the right rear wheel 4 R, the left front wheel 5 L and the right front wheel 5 R of the mower 2 travels on an uneven part of the ground surface, the front axle 12 tilts laterally with respect to the vehicle body 3, and the axle sensor 29 indicates a roll angle |θ| other than 0 degrees.

Figure 6:
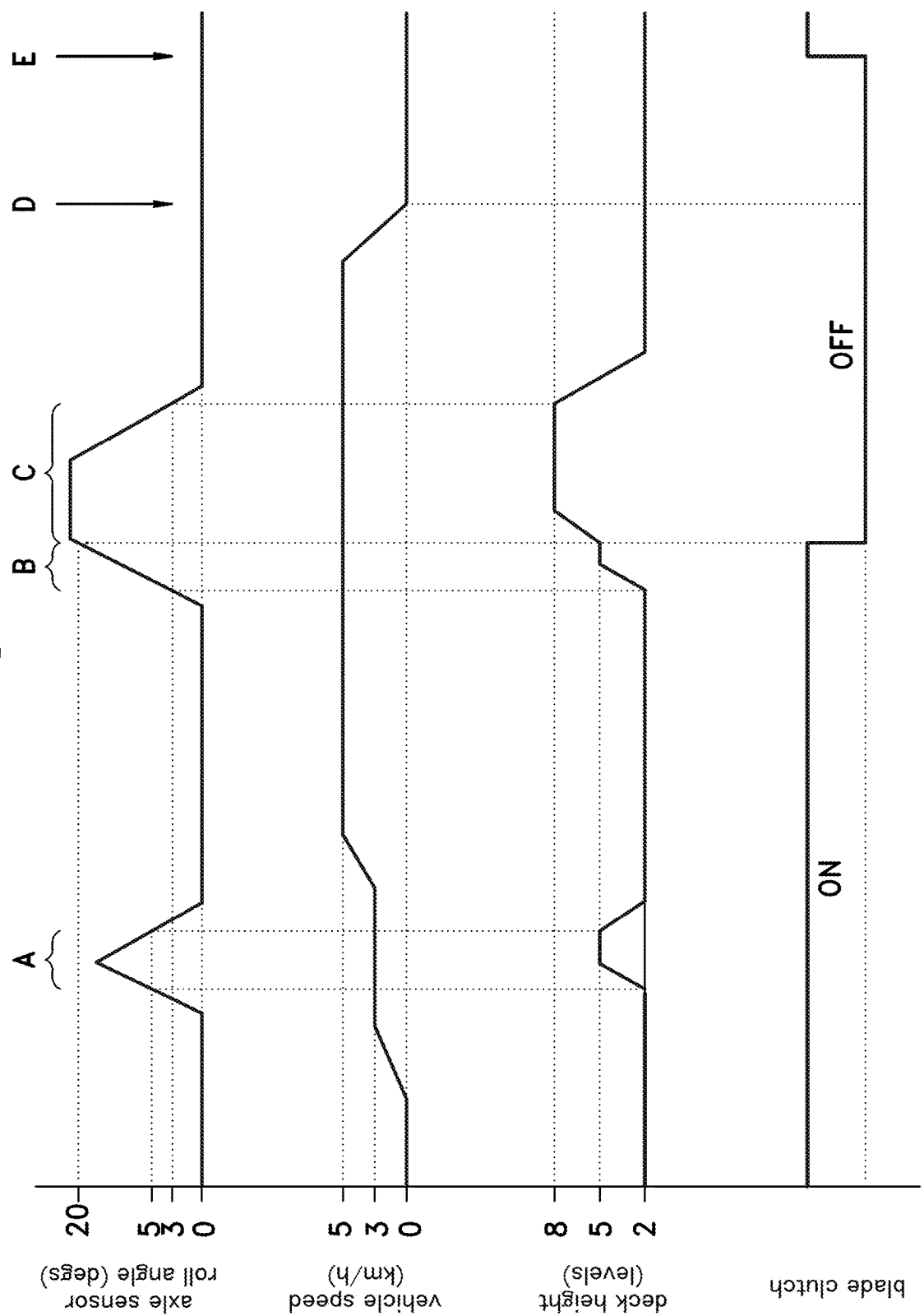
FIG. 6 is a time chart for illustrating the mode of operation of the control unit.

Referring to FIG. 6, suppose that the mower 2 allows the grass cutting height to be adjusted in eight levels, and the operator has set the grass cutting height to the second lowest level. The operator turns on the blade clutch 27 by moving the blade clutch lever 28 to rotate the blade 21, and then starts driving the mower 2.

When the mower 2 is traveling at a relatively low speed (3 km/h) as in interval A in FIG. 6, the first roll angle threshold value is set to 5 degrees for increasing the grass cutting height by three stages. When the roll angle |θ| exceeds 5 degrees, the control unit 1 increases the height of the deck 22 by three stages. Since the position of the deck 22 is raised relative to the vehicle body 3, even if the lower surface of the deck 22 and the ground surface decreases as the mower 2 travels on the uneven ground surface, the deck 22 is prevented from coming excessively close to the ground surface. Although the grass cutting height is higher than intended by the operator, the operator is still enabled to continue cutting the grass without any interruption. The second roll angle threshold value for returning the grass cutting height to the level selected by the operator is set to 5 degrees which is equal to the first roll angle threshold value in the illustrated embodiment. When the roll angle |θ| becomes 5 degrees or less, the grass cutting height is returned to the second lowest level as selected by the operator so that the operator can now cut the grass at the grass cutting height originally selected by the operator.

When the mower 2 is traveling at a relatively high speed (4 km/h or higher), the first roll angle threshold value and the second roll angle threshold value are 3 degrees which is smaller than the corresponding value (5 degrees) adopted when traveling at a relatively low speed.

As shown in interval B in FIG. 6, when the operator is driving the mower 2 at a relatively high speed (5 km/h), and the roll angle |θ| exceeds 3 degrees, the grass cutting height is raised by three stages. When the vehicle speed is comparatively high, the time required for the lower surface of the deck 22 to come into contact with the ground surface becomes correspondingly short while the mower 2 travels on an uneven ground surface. However, it takes a significant amount of time to raise the deck 22 by three stages from the level selected by the operator. Therefore, when the mower 2 is traveling at a relatively high speed, the value of the first roll angle threshold value is lowered so that the deck 22 can be raised in a relatively early stage, and the deck 22 is prevented from coming excessively close to the ground surface. Thereby, the cutting blade is 21 is prevented from coming excessively close to the ground surface.

As shown in interval C in FIG. 6, when the roll angle |θ| becomes greater than 20 degrees or the third roll angle threshold value for maximizing the grass cutting height and the fourth roll angle threshold value for turning off the blade clutch 27, the control unit 1 increases the grass cutting height to the eighth level which is the maximum height, and turns off the blade clutch 27 to stop the cutting blade 21 from rotating. Since the distance between the lower surface of the deck 22 and the ground surface becomes smaller as the roll angle of the front axle 12 increases, it is desirable to maximize the grass cutting height to prevent the deck 22 from coming excessively close to the ground surface, and to turn off the blade clutch 27 to minimize any damage to the cutting blade 21 even when the cutting blade 21 should come into contact with the ground surface.

When the roll angle |θ| becomes equal to or less than the second roll angle threshold (3 degrees) toward an end part of interval C, the grass cutting height is lowered to the second level as initially selected by the operator, but the blade clutch 27 remains off. Thus, when the mower 2 is traveling or when at least one of the rear wheels 4 and the front wheels 5 is on an uneven part of the ground surface, even if the operator moves the blade clutch lever 28, the blade clutch 27 cannot be turned on.

After the end of interval C in FIG. 6, the roll angle |θ| is again reduced to 0 degrees. Time point D indicates the time point at which the operator has brought the mower 2 to a stop. At this time, the forced turned off state of the blade clutch 27 is canceled. At time point E, the operator moves the blade clutch lever 28 to turns off the blade clutch 27, and turns it on once again, and this causes the cutting blade 21 to be restarted. By allowing the cutting blade 21 to be turned on only after the mower 2 has come to a stop on a flat ground surface, the operator is enabled to pay adequate attention to the condition of the mower 2 and confirm if the cutting blade 21 can be safely restarted.

The threshold values for the roll angle |θ| and the vehicle speed can be appropriately changed. The first roll angle threshold value and the second roll angle threshold value may be different from each other. Preferably, the second roll angle threshold value is smaller than the first roll angle threshold value. Also, the third roll angle threshold value and the fourth roll angle threshold value may be different from each other, but these threshold values are required to be greater than the first roll angle threshold value and the second roll angle threshold value. In addition, since the releasing of the forced turned off state of the blade clutch 27 occurs on a flat ground surface, the fifth roll angle threshold value for such a situation is set to 0 degrees, but the fifth roll angle threshold may be selected as a certain value corresponding to a ground surface which may be safely regarded as a flat ground surface.

In the above description, the first roll angle threshold value and the second roll angle threshold value were decreased when the vehicle speed becomes equal to or greater than a single predetermined value. However, the first roll angle threshold value and the second roll angle threshold value may be gradually decreased incrementally each time the vehicle speed exceeds one of a plurality of vehicle speed values or decreased continuously as the vehicle speed increases.

Figure 7:
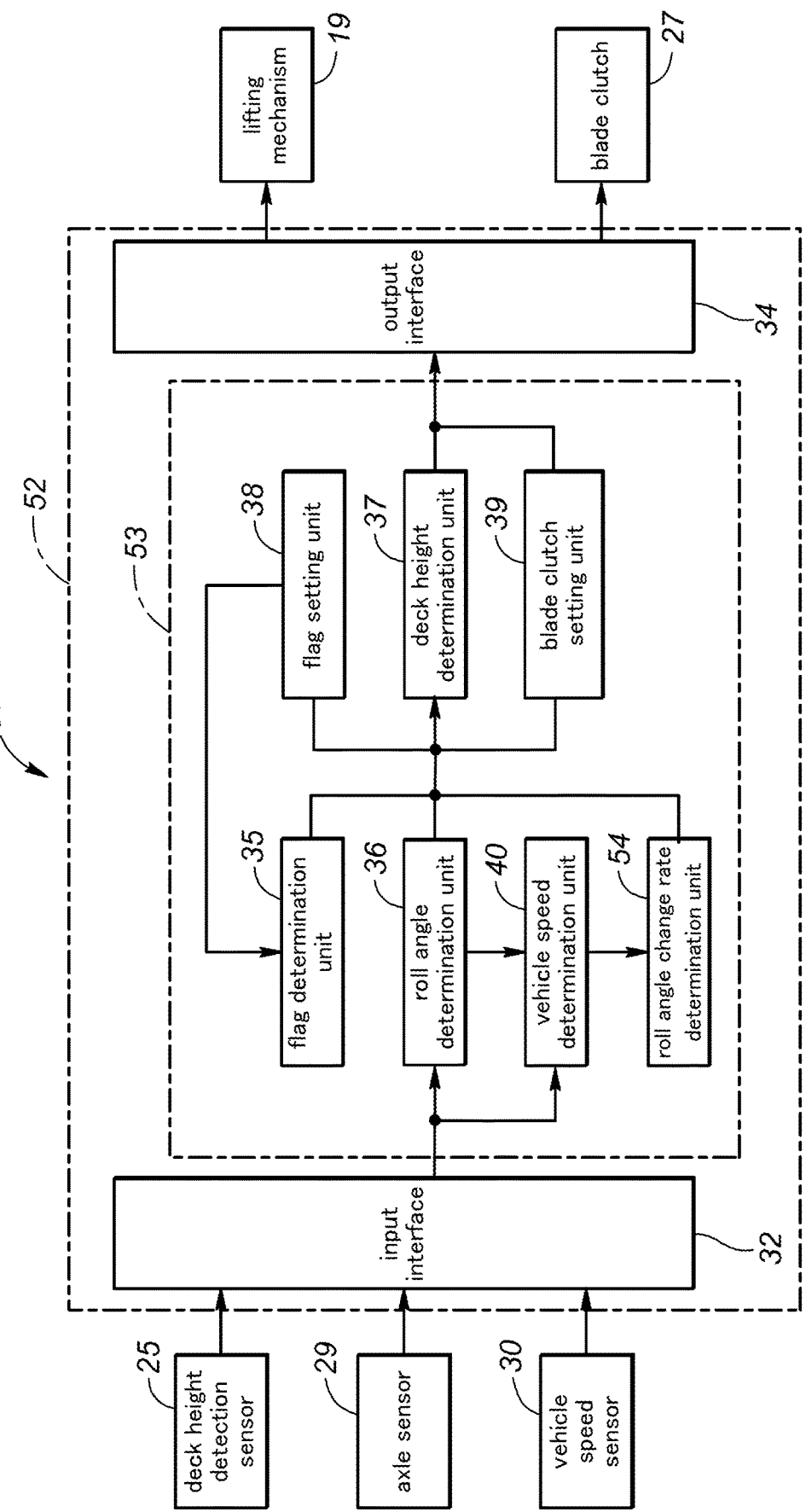
FIG. 7 is a block diagram of a control unit of a riding mower according to a second embodiment of the present invention.

A control unit 1 according to a second embodiment of the present invention is described in the following with reference to FIGS. 7 and 8. In the following disclosure, the parts corresponding to those of the previous embodiment are denoted with like numerals without necessarily repeating the description of such parts.

The control unit 1 differs from the control unit 1 of the first embodiment in that the grass cutting height is raised even when the roll angle |θ| is relatively small as long as the change rate of the roll angle |dθ/dt| is large. For this purpose, the computation unit 33 of the control unit 51 includes a roll angle change rate determination unit 54 in addition to the components of the computation unit 33 of the first embodiment.

When the blade protection flag is 0, the roll angle determination unit 36 of the computation unit 33 determines (the absolute value of) the roll angle |θ| (ST2, ST3), and classifies the control flow into three cases, Case 1-3 depending on the magnitude of the roll angle |θ|.

Case 1 (20 degrees>|θ|≥10 degrees)

If the roll angle |θ| is equal to or greater than 10 degrees and less than 20 degrees in steps ST2 and ST3, the height setting unit 37 corrects the height of the deck 22 to be three stages higher than the level set by the operator (ST4), and the flag setting unit 38 sets the correction flag to 1 (ST5). Upon receiving the signal from the control unit 1, the lifting mechanism 19 sets the deck 22 to a position which is three stages higher than the height selected by the operator.

Case 2: (|θ|≥20 degrees)

When the roll angle |θ| is equal to or greater than 20 degrees in step ST2 and step ST3, regardless of the vehicle speed, the height setting unit 37 of the computation unit 33 sets the grass cutting height to the maximum level regardless of the vehicle speed, and the lifting mechanism 19 raises the grass cutting height to the highest level (ST6). Further, the blade clutch setting unit 39 of the computation unit 33 turns off the blade clutch 27 (ST7). The flag setting unit 38 then sets the blade protection flag to 1 (ST8). When the blade protection flag is 1, even if the operator moves the blade clutch lever 28, the blade clutch 27 cannot be turned on or engaged.

Case 3 (10 degrees>|θ|≥0 degrees)

When the roll angle |θ| is greater than 0 degrees and equal to or less than 5 degrees in step ST3, the flag determination unit 35 determines if the correction flag is 0 (ST9).

When the correction flag is 0 in step ST9, or when the grass cutting height is as set by the operator, it is determined if the grass cutting height should be raised or not by taking into account the travel speed of the mower 2 and the absolute value of the change rate of the roll angle |dθ/dt|. The vehicle speed determination unit 40 of the computation unit 33 determines if the vehicle speed is equal to or higher than 4 km/h (ST10). When the vehicle speed is 4 km/h or higher in step ST10, the roll angle change rate determination unit 54 determines if the roll angle change rate |dθ/dt| is greater than 5 degrees/second (ST11).

When the vehicle speed is lower than 4 km/h in step ST10, the roll angle change rate determination unit 54 determines if the roll angle change rate |dθ/dt| is greater than 3 degrees/second (ST14). When the roll angle change rate |dθ/dt| is greater than the corresponding threshold value in each of steps ST11 and ST14, the height setting unit 37 raises the grass cutting height from the level set by the operator by three stages (ST12, ST15), and the flag setting unit 38 sets the correction flag to 0 (ST17, ST20). When the roll angle change rate |dθ/dt| is equal to or smaller than the corresponding threshold value in each of steps ST11 and ST14, no further processing is performed, and the grass cutting height is left as set by the operator.

In step ST9, when the correction flag is 1, or, in other words, when the grass cutting height is higher than the level set by the operator, the roll angle determination unit 36 determines the roll angle (ST17). If the roll angle |θ| is smaller than 5 degrees, the height setting unit 37 returns the grass cutting height to the level set by the operator (ST18), and the flag setting unit 38 sets the correction flag to 0 (ST19). Otherwise, no processing is performed and the grass cutting height is kept to be higher than the level set by the operator.

In step ST1, when the blade protection flag is 1 (Case 4), or, in other words, when the grass cutting height is at the maximum level and the blade clutch 27 is turned off to stop the blade 21 from rotating, similarly as in the first embodiment, the vehicle speed determination unit 40 and the roll angle determination unit 36 determine the vehicle speed and the roll angle, respectively (ST20, ST21). When the vehicle speed is 0 and the roll angle |θ| is 0 degrees, or, in other words, when the mower 2 is stationary on a flat ground surface, the flag setting unit 38 sets the blade protection flag to 0 (ST22). By setting the blade protection flag to 0, the operator is enabled to turn on and off the blade clutch 27 by using the blade clutch lever 28. If the vehicle speed is 0, and the roll angle |θ| is other than 0 degrees, the control process proceeds to step ST17.

According to the control unit 51 of the second embodiment, when the roll angle |θ| is relatively small, the possibility of excessive proximity between the deck 22 and the ground surface is determined from the roll angle change rate |dθ/dt|. If the roll angle change rate |dθ/dt| indicates a high likelihood of the deck 22 coming excessively close to the ground surface, the grass cutting height is raised. Therefore, even if the first roll angle threshold value is set greater than in the first embodiment, the deck 22 can be safely prevented from coming excessively close to the ground surface. By setting the first roll angle threshold to a comparatively large value, the condition under which the grass can be cut at an even grass cutting height can be expanded.

The threshold values of the roll angle |θ|, the threshold value of the roll angle change rate |dθ/dt| and the threshold value of the vehicle speed can be appropriately changed without departing from the spirit of the present invention.

Although the present invention has been described in terms of preferred embodiments thereof, it is obvious to a person skilled in the art that various alterations and modifications are possible without departing from the scope of the present invention. For example, the mowing unit 16 may be driven by an electric motor, instead of an internal combustion engine, and the electric power supplied to the electric motor may be discontinued when the roll angle has exceeded the fourth roll angle threshold value. The battery may be charged from a charger provided in a fixed facility, instead of being charged by an onboard generator powered by an engine. Also, the rear axle may consist of a center pivot axle while the front axle consists of a rigid axle.

Even though the mowers of the illustrated embodiments consisted of a riding mower, the mower may also be remote controlled by an operator positioned remotely from the mower, or may be operated in an autonomous fashion.

The invention claimed is:

1. A mower, comprising:
    a vehicle body;
    a first axle rigidly supported by the vehicle body and rotatably supporting a pair of wheels;
    a second axle supported by the vehicle body via a center pivot and rotatably supporting a pair of wheels;
    a power source for driving the pair of wheels of at least one of the first axle and the second axle;
    a mowing unit provided in a lower part of the vehicle body and including a cutting blade;
    a height adjusting mechanism provided on the vehicle body and configured to adjust a grass cutting height of the mowing unit;
    an axle sensor for detecting a roll angle of the second axle relative to the vehicle body; and
    a control unit for controlling the height adjusting mechanism so that the grass cutting height is increased from an initial level when an absolute value of the roll angle has exceeded a first roll angle threshold value.

2. The mower according to claim 1, further comprising a speed sensor for detecting a travel speed of the mower, wherein the control unit is configured to progressively reduce the first roll angle threshold value in a continuous or incremental manner with an increase in the travel speed of the mower.

3. The mower according to claim 1, wherein the control unit is configured to compute an absolute value of a change rate of the roll angle, and to increase the grass cutting height even when the absolute value of the roll angle is equal to or smaller than the first roll angle threshold value if the absolute value of the change rate of the roll angle is greater than a roll angle change rate threshold value.

4. The mower according to claim 3, further comprising a speed sensor for detecting a travel speed of the mower, wherein the control unit is configured to progressively reduce the roll angle change rate threshold value in a continuous or incremental manner with an increase in the travel speed of the mower.

5. The mower according to claim 1, wherein when the grass cutting height is increased by the control unit, and the absolute value of the roll angle is equal to or smaller than a second roll angle threshold value, the control unit is configured to restore the grass cutting height to the initial level.

6. The mower according to claim 5, wherein the second roll angle threshold value is smaller than the first roll angle threshold value.

7. The mower according to claim 1, wherein the control unit is configured to raise the mowing unit to a maximum height when the absolute value of the roll angle has exceeded a third roll angle threshold value which is greater than the first roll angle threshold value.

8. The mower according to claim 1, wherein the control unit is configured to control an operation of the cutting blade, and to stop driving the cutting blade when the absolute value of the roll angle has exceeded a fourth roll angle threshold value which is greater than the first roll angle threshold value.

9. The mower according to claim 8, further comprising a speed sensor for detecting a travel speed of the mower, wherein the control unit is configured to enable an operator to restart the cutting blade when the absolute value of the roll angle has changed from a value greater than the fourth roll angle threshold value to a value smaller than a fifth roll angle threshold value which is smaller than the first roll angle threshold value, and the travel speed has been reduced to zero.

* * * * *